(12) United States Patent
Lee et al.

(10) Patent No.: US 11,179,862 B2
(45) Date of Patent: Nov. 23, 2021

(54) NOTCHING APPARATUS AND METHOD FOR SECONDARY BATTERY

(71) Applicant: LG CHEM, LTD., Seoul (KR)

(72) Inventors: Byeong Kyu Lee, Daejeon (KR); Cha Hun Ku, Daejeon (KR); Jung Kwan Pyo, Daejeon (KR); Jin Gon Kim, Daejeon (KR); Tai Jin Jung, Daejeon (KR); Won Nyeon Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 125 days.

(21) Appl. No.: 16/629,866

(22) PCT Filed: Apr. 1, 2019

(86) PCT No.: PCT/KR2019/003815
§ 371 (c)(1),
(2) Date: Jan. 9, 2020

(87) PCT Pub. No.: WO2019/231096
PCT Pub. Date: Dec. 5, 2019

(65) Prior Publication Data
US 2021/0086388 A1 Mar. 25, 2021

(30) Foreign Application Priority Data
May 31, 2018 (KR) .................. 10-2018-0062419

(51) Int. Cl.
B26D 7/14 (2006.01)
B26F 1/12 (2006.01)
(Continued)

(52) U.S. Cl.
CPC .................. *B26D 7/14* (2013.01); *B26F 1/12* (2013.01); *H01M 4/04* (2013.01); *H01M 50/103* (2021.01); *Y02E 60/10* (2013.01)

(58) Field of Classification Search
None
See application file for complete search history.

(56) References Cited

FOREIGN PATENT DOCUMENTS

| CN | 1874038 A | 12/2006 |
|---|---|---|
| CN | 205463833 U | 8/2016 |

(Continued)

OTHER PUBLICATIONS

International Search Report (PCT/ISA/210) issued in PCT/KR2019/003815, dated Jul. 11, 2019.

*Primary Examiner* — Daniel S Gatewood
(74) *Attorney, Agent, or Firm* — Birch, Stewart, Kolasch & Birch, LLP

(57) ABSTRACT

Discussed is a notching apparatus for a secondary battery that includes: a lower mechanism comprising a die and a die holder to which the die is fixed, the die engaging an electrode provided with a coating portion and a non-coating portion; a stripper including a first stripper pressing the coating portion and a pair of second strippers pressing and fixing the non-coating portion; an upper mechanism including a punch provided between the pair of second strippers and provided with a cutting blade cutting the non-coating portion disposed between the pair of second strippers and a punch holder allowing the punch to move in a direction of the lower mechanism; and a pressing member pressing the non-coating portion disposed between the pair of second strippers to increase in tension force when the non-coating portion is cut by the punch.

13 Claims, 15 Drawing Sheets

(51) Int. Cl.
*A01C 7/04* (2006.01)
*A01C 7/06* (2006.01)
*A01C 7/20* (2006.01)
*A01C 5/04* (2006.01)
*H01M 50/103* (2021.01)
*H01M 4/04* (2006.01)

(56) References Cited

FOREIGN PATENT DOCUMENTS

| | | | |
|---|---|---|---|
| CN | 206122448 U | | 4/2017 |
| CN | 106626197 A | | 5/2017 |
| CN | 106984694 A | | 7/2017 |
| JP | 5-69055 A | | 3/1993 |
| JP | 2001-110409 A | | 4/2001 |
| JP | 2003-317709 A | | 11/2003 |
| JP | 2007-61895 A | | 3/2007 |
| JP | 2013-22607 A | | 2/2013 |
| JP | 5386991 B2 | | 1/2014 |
| JP | 2018-58079 A | | 4/2018 |
| KR | 10-2007-0007522 A | | 1/2007 |
| KR | 10-1115299 B1 | | 3/2012 |
| KR | 10-2012-0076850 A | | 7/2012 |
| KR | 10-2013-0095368 A | | 8/2013 |
| KR | 10-2015-0141411 A | | 12/2015 |
| KR | 10-2017-0027993 A | | 3/2017 |
| KR | 20170027993 A | * | 3/2017 |
| KR | 10-1813249 B1 | | 12/2017 |
| KR | 10-2018-0013788 A | | 2/2018 |

\* cited by examiner

NOTCHING APPARATUS AND METHOD FOR SECONDARY BATTERY

CROSS-REFERENCE TO RELATED APPLICATION

The present application claims the benefit of the priority of Korean Patent Application No. 10-2018-0062419, filed on May 31, 2018, which is hereby incorporated by reference in its entirety.

TECHNICAL FIELD

The present invention relates to a notching apparatus and method for a secondary battery, which cuts a non-coating portion provided in an electrode, and more particularly, to a notching apparatus and method for a secondary battery, in which a non-coating portion increases in tension force when the non-coating portion is cut to improve cutting accuracy.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

The electrode comprises a coating portion coated with an electrode active material and an non-coating portion having no electrode active material. In the electrode having such a configuration, the non-coating portion is cut through a notching apparatus to form an electrode tab.

That is, the notching apparatus comprises a lower plate on which a die, on which an electrode is disposed, is mounted, a stripper fixing the electrode disposed on the die, and an upper plate on which a punch cutting a non-coating portion of the electrode disposed on the die is mounted.

However, in the notching apparatus, although the coating portion is fixed by the stripper, there is a problem in that the non-coating portion is not fixed due to a thickness of the coating portion. Particularly, in the notching apparatus, when the non-coating portion that is not fixed is cut, there is a problem in that a surface to be cut is irregularly cut due to the moving phenomenon of the non-coating portion.

DISCLOSURE OF THE INVENTION

Technical Problem

The present invention has been developed in order to solve the above problems, and an object of the present invention is to provide a notching apparatus and method, in which each of a coating portion and a non-coating portion, which are provided in an electrode, is pressed to enhance fixing force of the coating portion and the non-coating portion, and particularly, when the non-coating portion is cut, the non-coating portion increase in tension force to improve cutting accurate.

Technical Solution

To achieve the above object, a notching apparatus for a secondary battery according to a first embodiment of the present invention includes: a lower mechanism including a die on which an electrode provided with a coating portion coated with an electrode active material and a non-coating portion that is not coated with the electrode active material is disposed and a die holder to which the die is fixed; a stripper including a first stripper disposed above a coating portion disposed on the lower mechanism to press the coating portion while descending toward the coating portion and a pair of second strippers disposed above a non-coating portion disposed on the lower mechanism to press and fix the non-coating portion while descending toward the non-coating portion; an upper mechanism including a punch provided between the pair of second strippers and provided with a cutting blade cutting the non-coating portion disposed between the pair of second strippers and a punch holder fixing the punch to allow the punch to move in direction of the lower mechanism; and a pressing member pressing the non-coating portion disposed between the pair of second strippers to increase in tension force when the non-coating portion is cut by the punch.

The pressing member may be provided on a bottom surface of the punch and further protrude downward than the cutting blade when viewed with respect to a surface of the non-coating portion.

The pressing member may be integrally provided or detachably provided on a bottom surface of the punch.

A pressing surface of the pressing member, which presses the non-coating portion, may be provided as a horizontal surface.

The pressing member may be made of a synthetic resin having elasticity.

The first stripper may be installed on the punch holder corresponding to the coating portion to press the coating portion while descending by the punch holder.

The first stripper may be installed on the punch holder so as to be adjustable in length in the direction of the lower mechanism or in an opposite direction.

The second strippers may be installed on the punch holder corresponding to the non-coating portion to press the non-coating portion.

Each of the second strippers may be installed to be adjustable in length in the direction of the lower mechanism or in an opposite direction.

The non-coating portion may include a connection surface connected to the coating portion and a non-coating surface extending from the connection surface, and the second strippers may press the non-coating surface to fix the non-coating surface to the die.

The punch may continuously cut the connection surface and the non-coating surface, which are disposed between the pair of second strippers.

The second strippers may press the non-coating surface without fixing the non-coating surface to the lower mechanism when the punch cuts the connection surface.

The second strippers may press the non-coating surface so as to be fixed to the lower mechanism when the punch cuts the non-coating surface.

To achieve the above object, a notching method for a secondary battery according to the first embodiment of the present invention includes: a step (a) of disposing an electrode provided with a coating portion coated with an electrode active material and a non-coating portion that is not coated with the electrode active material on a die of a lower mechanism; a step (b) of pressing and fixing the coating portion of the electrode disposed on the die by using a first stripper of a stripper; a step (c) of pressing the non-coating portion of the electrode disposed on the die by using a second stripper of the stripper, wherein the second stripper is provided in a pair, and the pair of second strippers primarily press a non-coating surface of the non-coating portion including a connection surface connected to the coating portion and the non-coating surface extending from the connection surface without fixing the non-coating surface to the lower mechanism; a step (d) of pressing the non-coating portion disposed between the pair of second strippers by using a pressing member to increase in tension force; a step (e) of cutting the connection surface of the non-coating portion that increases in tension force by using a punch of the upper mechanism; a step (f) of secondarily pressing the non-coating surface of the non-coating portion by using the second strippers so as to be fixed to the lower mechanism when the cutting of the connection surface is completed; and a step (g) of cutting the non-coating surface by using the punch of the upper mechanism when the non-coating surface is completely fixed.

In the step (d), the pressing member may press the non-coating surface of the non-coating portion to increase in tension force.

Advantageous Effects

1. According to the present invention, provided is the stripper provided with the first stripper fixing the coating portion of the electrode and the second stripper fixing the non-coating portion of the electrode. Thus, the coating portion and the non-coating portion of the electrode may be pressed and fixed. Therefore, when the non-coating portion is cut, the surface to be cut of the non-coating portion may be prevented from being irregularly cut to improve the cutting accuracy.

Particularly, the pressing member that presses the non-coating portion to enhance the tension force when the non-coating portion is cut may be provided to prevent the wrinkles from occurring on the non-coating portion, thereby the cutting accuracy of the non-coating portion.

2. According to the present invention, the pressing member may further protrude downward than the cutting blade when viewed from the surface of the non-coating portion. Thus, the non-coating portion may be cut without generating the wrinkles on the non-coating portion to improve the cutting accuracy of the non-coating portion.

3. According to the present invention, the pressing member may be provided integrally o detachably on the bottom surface of the punch. That is, the pressing member and the punch may be integrally provided to be easily manufactured. Also, the pressing member may be detachably provided on the punch. Thus, the pressing member having the various size may be mounted according to the size of the electrode to improve the compatibility.

4. According to the present invention, the pressing surface of the pressing member that presses the non-coating portion may be provided as the horizontal surface. That is, the adhesion force between the pressing member and the non-coating portion may increase to prevent the non-coating portion from being damaged by the pressing member, and particularly, the non-coating portion may be stably pressed to prevent the wrinkles from occurring thereon.

5. According to the present invention, when the pressing member is detachably provided on the punch, the pressing member may be made of the synthetic resin having the elasticity. Thus, the non-coating portion may be prevented from being excessively pressed by the pressing member to prevent the non-coating portion from being damaged.

6. According to the present invention, the first stripper may be installed on the punch holder comprising the punch to press the coating portion while descending by the punch holder. Thus, the first stripper may be easily installed. Particularly, the first stripper may descend together with the punch when the punch holder descends. As a result, the coating portion may be fixed, and the non-coating portion may be cut through only the descending of the punch holder.

7. According to the present invention, the first stripper may be installed on the punch holder so as to be adjustable in length that is directed toward the electrode. Thus, the coating portion of the electrode having the various thicknesses may be effectively fixed, and the pressing force applied to the coating portion of the electrode may be adjusted.

8. According to the present invention, the second stripper may be provided in a pair, and the pair of second strippers may be installed on the punch holder corresponding to the non-coating portion. Thus, the second stripper may be easily installed. Particularly, the second stripper may descend together with the punch when the punch holder descends. As a result, the non-coating portion may be fixed and cut through only the descending of the punch holder. Particularly, the pair of second strippers may be provided on both the sides of the punch. Thus, the non-coating portion may be more stably cut.

9. According to the present invention, the second stripper may be installed on the punch holder so as to be adjustable in length that is directed toward the electrode. Thus, the non-coating portion of the electrode having the various thicknesses may be effectively fixed, and the pressing force applied to the non-coating portion of the electrode may be adjusted.

10. According to the present invention, the second stripper may press the non-coating surface of the non-coating portion having the connection surface connected to the coating portion and the non-coating surface connected to the connection surface. Thus, the non-coating portion may be stably fixed without having the wrinkles.

11. According to the present invention, the second stripper may press the non-coating surface without fixing the non-coating surface when the punch cuts the connection surface of the non-coating portion. Thus, the punch may stably cut the connection surface of the non-coating surface that is not fixed to improve the cutting quality.

12. According to the present invention, when the non-coating surface of the non-coating portion is cut, the second stripper may press the non-coating surface while fixing the non-coating surface. Thus, the punch may stably cut the non-coating surface of the non-coating portion to improve the cutting quality.

MODE FOR CARRYING OUT THE INVENTION

Figure 1:
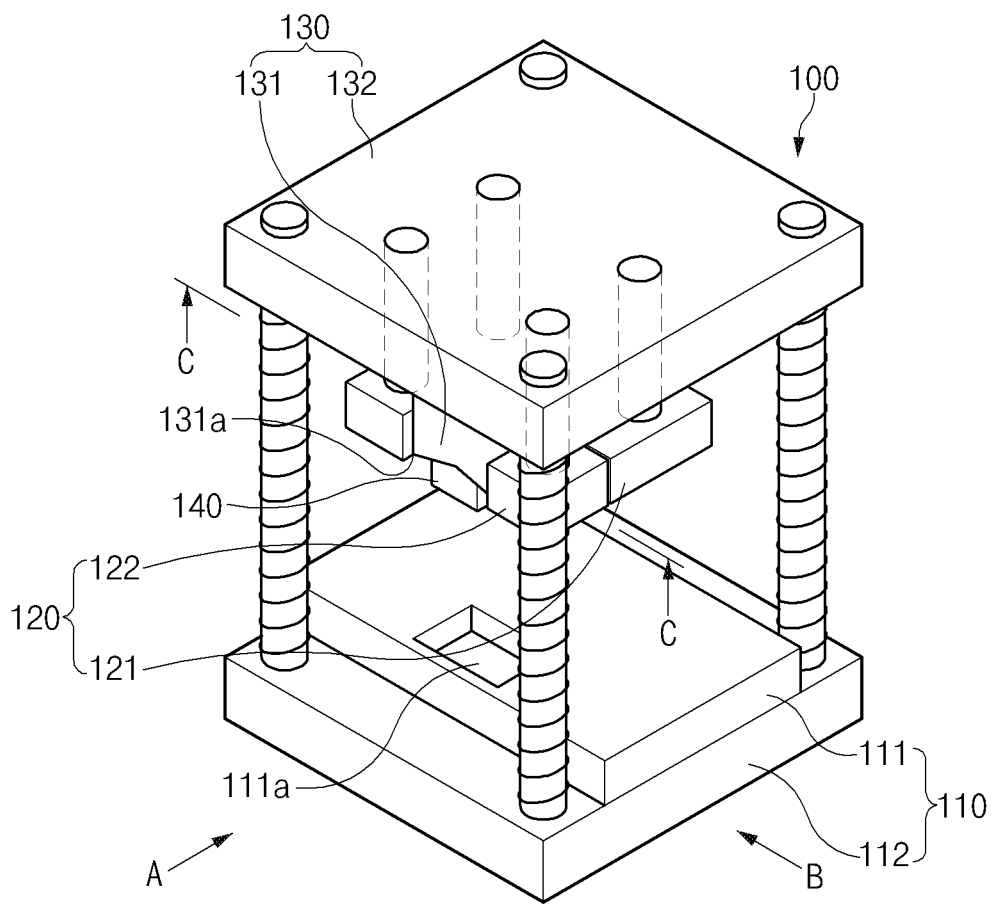
FIG. 1 is a perspective view of a notching apparatus for a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

In the attached drawings, the front view is a view when viewed in a direction 'A' of FIG. 1, and a side view is a view when viewed in a direction 'B' of FIG. 1.

[Electrode]

Figure 6:
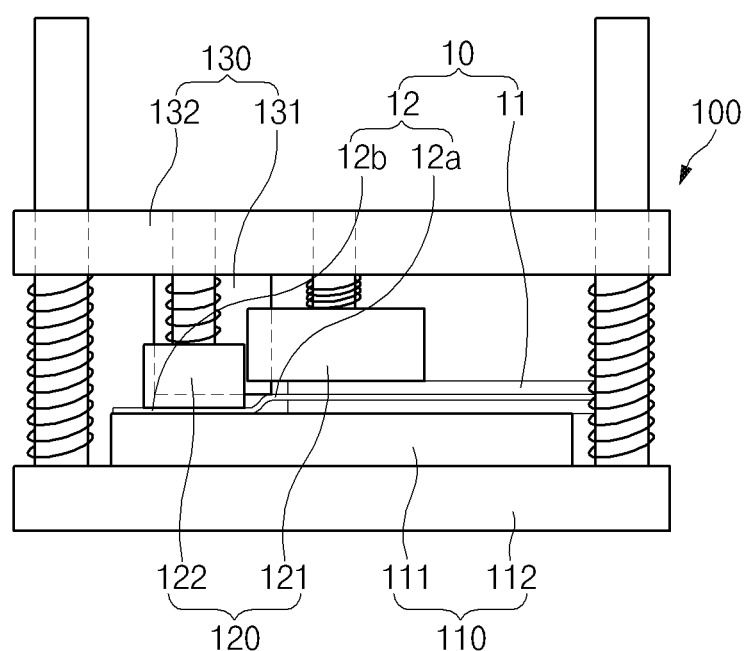
FIG. 6 is a side view illustrating pressing states of first and second strippers according to the first embodiment of the present invention.

Referring to FIG. 6, an electrode 10 comprises a coating portion 11 coated with an electrode active material and a non-coating portion 12 that is not coated with the electrode active material. The non-coating portion 12 comprises a connection surface 12a connected to the coating portion 11 and a non-coating surface 12b extending from the connection surface 12a.

The electrode 10 having the above-described configuration is processed into an electrode tab by cutting the non-coating portion 12. Here, the notching apparatus for the secondary battery according to the present invention is used.

Particularly, the notching apparatus for the secondary battery according to the present invention may have a structure, in which the non-coating portion is cut without forming wrinkles on the connection surface when the non-coating portion is cut, to improve cutting quality.

Hereinafter, a notching apparatus for a secondary battery according to an embodiment of the present invention will be described.

[Notching Apparatus for Secondary Battery According to First Embodiment of the Present Invention]

As illustrated in FIGS. 1 to 5, a notching apparatus 100 according to a first embodiment of the present invention, which cuts a non-coating portion provided on an electrode to be processed into an electrode tab, comprises a lower mechanism 110 on which the electrode 10 is disposed, a stripper 120 fixing the electrode 10 disposed on the lower mechanism 110, an upper mechanism 130 cutting the non-coating portion 12 fixed to the stripper 120, and a pressing member 140 pressing the non-coating portion 12 by using the upper mechanism 130 to increase in tension force when the non-coating portion 12 is cut.

Lower Mechanism

The lower mechanism 110 may be configured to mount the electrode thereon and comprise a die 111 on which the electrode 10 constituted by the coating portion 11 and the non-coating portion 12 is disposed and a die holder 112 to which the die 111 is fixed. An insertion groove 111a may be formed in a surface of the die 111, on which the non-coating portion 12 is disposed, and a punch cutting the non-coating portion may be inserted into the insertion groove 111a to effectively cut the non-coating portion.

Stripper

The stripper may press each of the coating portion and the non-coating portion, which are disposed on the die, to fix each of the coating portion and the non-coating portion. Thus, when the non-coating portion is cut, the non-coating portion may be prevented from moving to improve the cutting quality of the non-coating portion.

Figure 2:
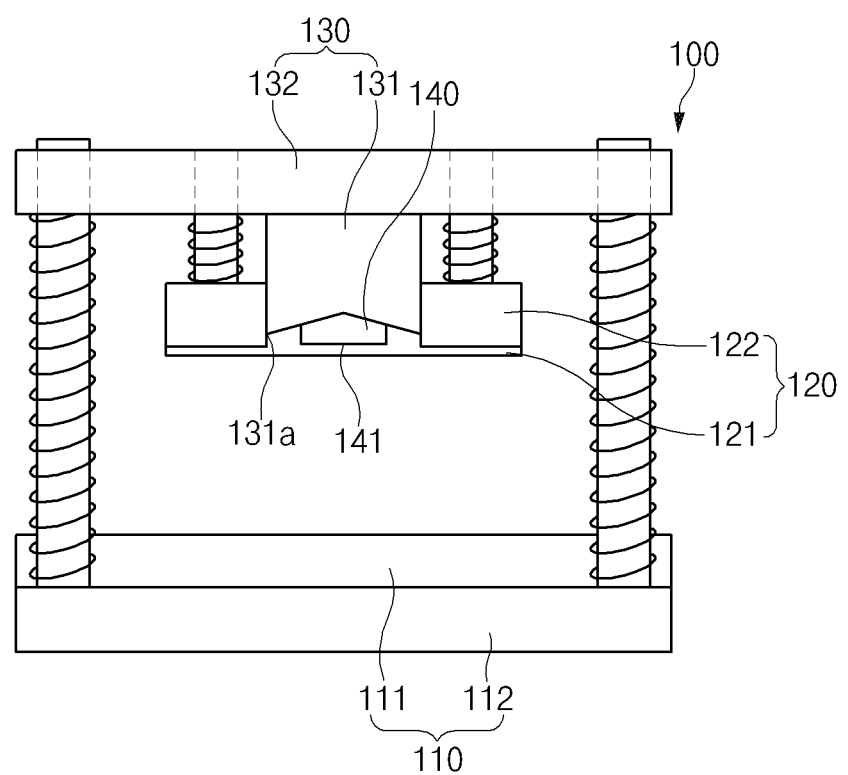
FIG. 2 is a front view of the notching apparatus for the secondary battery according to the first embodiment of the present invention.
Figure 3:
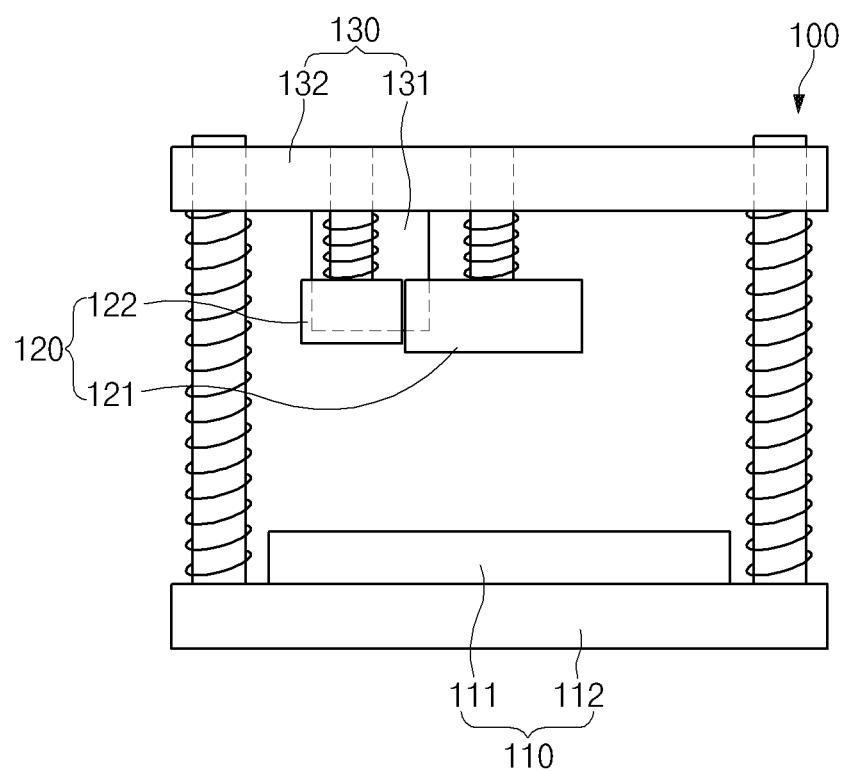
FIG. 3 is a side view of the notching apparatus for the secondary battery according to the first embodiment of the present invention.
Figure 4:
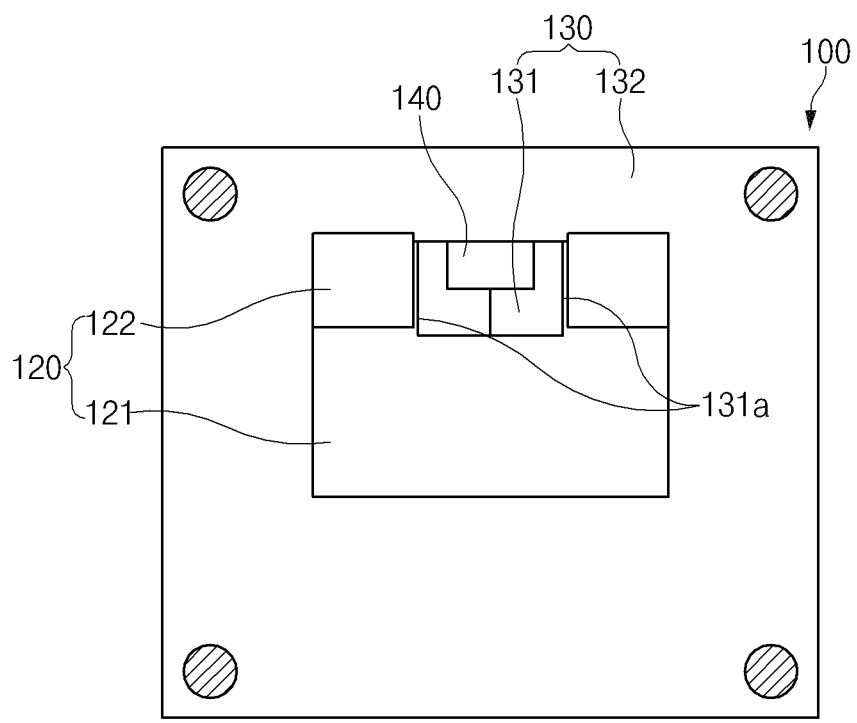
FIG. 4 is a cross-sectional view taken along line C-C of FIG. 1.

For example, as illustrated in FIGS. 2 to 4, the stripper 120 comprises a first stripper 121 disposed above the coating portion 11 disposed on the lower mechanism 110 to press and fix the coating portion 11 while descending toward the coating portion 11 and a second stripper 122 disposed above the non-coating portion 12 disposed on the lower mechanism 110 to press and fix the non-coating portion 12 while descending toward the non-coating portion 12.

That is, the stripper 120 comprises the first stripper 121 and the second stripper 122. The first stripper 121 and the second stripper 122 may press the coating portion 11 and the non-coating portion 12 of the electrode 10 to fix the coating portion 11 and the non-coating portion 12, respectively. That is to say, the first stripper 121 may press and fix the coating portion 11, and the second stripper 122 may press and fix the non-coating portion 12. Thus, all the coating portion 11 and the non-coating portion 12 may be firmly fixed. Particularly, the non-coating portion may be stably fixed regardless of a height deviation between the coating portion 11 and the non-coating portion 12 to improve cutting accuracy when the non-coating portion 12 is cut.

Upper Mechanism

The upper mechanism may be configured to cut the non-coating portion of the electrode, which is fixed by the stripper. The upper mechanism comprises a punch 131 cutting the non-coating portion 12 of the electrode 10, which is fixed by the stripper 120, and a punch holder 132 fixing the punch 131 to allow the punch 131 to move toward the lower mechanism 110.

That is, the upper mechanism 130 cuts the non-coating portion 12 of the electrode 10, which is fixed by the stripper 120, while descending together with the punch holder 132 when the punch holder 132 descends toward the lower mechanism 110.

Referring to FIG. 1, the first stripper 121 is installed on the punch holder 132 corresponding to the coating portion 11 disposed on the die 111 to press the coating portion 11 while descending by the punch holder 132.

That is, the first stripper 121 may be installed on the punch holder 132. Thus, the first stripper 121 may press the coating portion 11 while descending together with the punch holder 132 when the pouch holder 132 descends. As a result, the first stripper 121 may be simplified in structure to reduce manufacturing cost.

Here, the first stripper 121 may be disposed closer to the electrode 10, which is disposed on the die 111, than the punch 131 installed on the punch holder 132. That is, the first stripper 121 and the punch 131 has a height difference therebetween so that the punch 131 cuts the non-coating portion 12 of the electrode 12 after the first stripper 121 presses and fixes the coating portion 11 of the electrode 10 when the punch holder 132 descends. For example, as illustrated in FIG. 2, the first stripper 121 and the punch 131 are installed on a bottom surface of the punch holder 132. Here, the first stripper 121 is installed at a position higher than that of the punch 131 when viewed with respect to the die.

As illustrated in FIG. 4, the second stripper 122 is provided in a pair, and the punch 131 is disposed between the pair of second strippers 122. That is, the pair of second strippers 122 respectively press and fix both ends of the non-coating portion 12, and the punch 131 cuts the non-coating portion 12 disposed between the pair of second strippers 122. Thus, fixing force and cutting force of the non-coating portion 12 may increase at the same time.

Here, the punch 131 comprises a cutting blade 131a on each of both ends thereof, which are disposed close to the pair of second strippers 122, and the cutting blade 131a cuts each of surfaces of the non-coating portion 12 that is disposed close to the pair of second strippers 122.

The second stripper 122 is installed closer to the electrode 10 than the punch 131 when fixed to the punch holder 132. That is, the second stripper 122 and the punch 131 has a height difference therebetween so that the punch 131 cuts the non-coating portion 12 of the electrode 12 after the second stripper 122 presses the non-coating portion 11 of the electrode 10 when the punch holder 132 descends. For example, the second stripper 122 and the punch 131 are installed on a bottom surface of the punch holder 132. Here, the second stripper 122 is installed at a position higher than that of the punch 131 when viewed with respect to the die.

A bottom surface of the second stripper 122 and a bottom surface of the punch 131 has a height difference of 10 μm to 20 μm, particularly, a height difference of 15 μm. That is, the connection surface 12a of the non-coating portion 12 may be bent when the non-coating surface 12b of the electrode 10 is pressed by the second stripper 122. Here, a height difference between the uppermost end of the bent connection surface 12a and the non-coating surface 12b is formed to 10 μm or less. Thus, a height difference between the bottom surface of the second stripper 122 and the bottom surface of the punch 131 is formed to 10 μm to 20 μm, particularly, formed to 15 μm. Thus, in the state in which the second stripper 122 presses the non-coating surface 12b without fixing the non-coating portion 12b, the punch 131 may cut the connection surface 12a of the non-coating portion 12.

Figure 5:
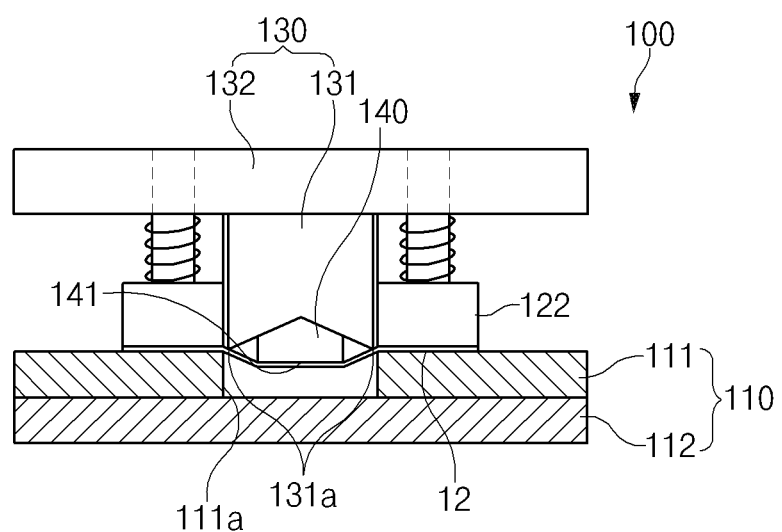
FIG. 5 is a front view illustrating a pressing state of a pressing member according to the first embodiment of the present invention.

In summary, as illustrated in FIG. 5, the first stripper 121, the second stripper 122, and the punch 131 are installed on the bottom surface of the punch holder 132. Here, the first stripper 121 is installed to be disposed at the lowermost end when viewed in FIG. 2, the second stripper 122 is installed to be disposed at a middle portion when viewed in FIG. 2, and the punch 131 is installed to be disposed at the uppermost end when viewed in FIG. 2. Due to the above-described configuration, when the punch holder 132 descends, the first stripper 121 presses the coating portion of the electrode 10. Then, the second stripper 122 presses the non-coating portion 12 of the electrode 10 without fixing the non-coating portion 12, and then, the punch 131 cuts the connection surface of the non-coating portion 12 of the electrode 10.

The second stripper 122 presses the non-coating surface 12b of the non-coating portion 12 to fix the non-coating surface 12b to the die 111. That is, the connection surface 12a of the non-coating portion 12 is connected to the coating portion 11. Thus, when the connection surface 12a is pressed, the connection surface 12a may be folded at a right angle. Therefore, the second stripper 122 may press the non-coating surface 12b extending from the connection surface 12a to stably press the non-coating portion 12.

The punch 131 sequentially cuts the connection surface 12a and the non-coating surface 12b of the non-coating portion 12 disposed between the pair of second strippers 122. Here, the second stripper 122 presses the non-coating surface 12b to the die 111 of the lower mechanism 110 when the punch 131 cuts the connection surface 12a. That is, when the second stripper 122 presses the non-coating surface 12b so as to be fixed to the die 111 of the lower mechanism 110, the connection surface 12a of the non-coating portion 12 may be wrinkled while being bent. That is to say, the connection surface 12a may be formed to be bent between the coating portion 11 and the non-coating surface 12b. In this state, when the punch 131 cuts the connection surface 12a, burr may be formed on the cut surface of the connection surface 12a to cause cutting defects. To prevent this phenomenon, the second stripper 122 may press the non-coating surface 12b without fixing the non-coating surface 12b to the die 111 of the lower mechanism 110 when the punch 131 cuts the connection surface 12a to prevent wrinkles from being formed on the connection surface 12a. In this state, the punch 131 cuts the connection surface 12a to prevent the burr from being formed on the cut surface of the connection surface 12a, thereby improving the cutting quality.

The second stripper 122 presses the non-coating surface 12b to be fixed to the die 111 of the lower mechanism 110 when the punch 131 cuts the non-coating surface 12b. That is, the non-coating surface 12b is disposed to be closely attached to the die 111. Thus, even though the non-coating surface 12b is fixed, the wrinkles may not be formed on the non-coating surface 12b. Thus, the second stripper 122 may press the non-coating surface 12b to be fixed to the die 111 of the lower mechanism 110 when the punch 131 cuts the non-coating surface 12b, thereby improving the cutting quality of the non-coating surface 12b.

Pressing Member

As illustrated in FIG. 5, the pressing member 140 is configured to increase in tension force of the non-coating portion disposed between the pair of second strippers. When the non-coating portion 12 is cut by the punch 131, the pressing member 140 may press the non-coating portion 12 to increase in the tension force, thereby significantly preventing the wrinkles from being formed on the non-coating portion 12 and improving cutting accuracy when the non-coating portion 12 is cut by the punch 131.

Here, the pressing member 140 is disposed on the bottom surface of the punch 131. Here, when viewed with respect to the surface of the non-coating portion 12, the pressing member 140 may further protrude downward than the cutting blade 131a (in a direction of the non-coating portion). Thus, the pressing member 140 may press the non-coating portion to increase in tension force before the cutting blade 131a cuts the non-coating portion 12. As a result, the non-coating portion 12 may be cut in a state in which the wrinkles are removed.

Particularly, the pressing member 140 is disposed above the second stripper 122 when viewed with respect to the surface of the non-coating portion 12. Thus, the second stripper 122 presses the non-coating portion 12, and then, the pressing member 140 presses the non-coating portion 12 to increases in tension force.

In summary, referring to FIG. 2, the cutting blade 131a of the punch 131, the pressing member 140, the second stripper 122, and the first stripper 121 gradually protrude downward in sequence.

The pressing member 140 may be integrally provided on the bottom surface punch 131 or detachably provided on the bottom surface of the punch 131.

For example, as illustrated in FIG. 1, the pressing member 140 is integrally provided on the bottom surface of the punch 131. That is, when the punch 131 is molded, the pressing member 140 may be molded together with the punch 131 to improve ease of manufacture.

Figure 15:
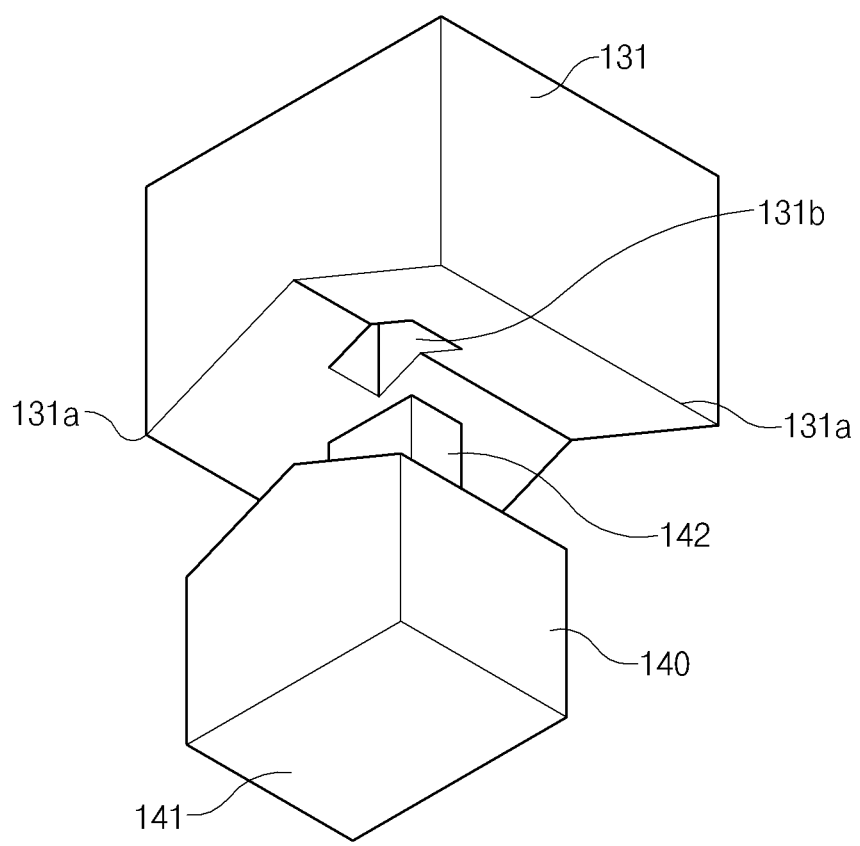
FIG. 15 is a perspective view illustrating another example of the notching apparatus for the secondary battery according to the first embodiment of the present invention.

For another example, as illustrated in FIG. 15, the pressing member 140 is detectably provided on the bottom surface of the punch 131. That is, a coupling groove 131b is formed in a center of the bottom surface of the punch 131, and a coupling protrusion 142 to be detachably coupled to the coupling groove 131b is formed on the pressing member 140. Thus, the pressing member having various sizes may be selected according to a size of the electrode so as to be coupled to the punch 131, thereby improving ease of use and compatibility.

The pressing surface 141 of the pressing member 140, which presses the non-coating portion 12, may be provided as a horizontal surface to increase in contact area between the non-coating portion 12 and the pressing member 140. Thus, force pressing the pressing member 140 may be uniformly dispersed into the contact area between the non-coating portion 12 and the pressing member 140 to significantly prevent the non-coating portion 12 from being damaged.

The pressing member 140 may be made of a synthetic resin having elasticity. Thus, the non-coating portion 12 may be elastically pressed by the pressing member 140 to significantly prevent the non-coating portion 12 from being damaged.

The pressing member 140 presses the non-coating surface 12b provided on the non-coating portion 12 to increase in tension force. That is, the connection surface 12a may be formed to be bent between the coating portion 11 and the non-coating surface 12b. Thus, when the pressing member 140 presses the connection surface 12a, the connection surface 12a may be folded to cause defects. Thus, it is preferable that the pressing member 140 presses the non-coating surface 12b to increase in tension force.

The notching apparatus 100 for secondary battery according to the first embodiment of the present invention, which has the above-described configuration, comprises the stripper 120 comprising the first stripper 121 and the second stripper 122. Therefore, the coating portion 11 and the non-coating portion 12 of the electrode 10 may be separately pressed and fixed. As a result, all the coating portion 11 and the non-coating portion 12 may be stably fixed. Particularly, when the non-coating portion 12 is cut, the non-coating portion may increase in tension force through the pressing member 140 to prevent the wrinkles from being formed on the non-coating portion, thereby improving the cutting accuracy of the non-coating portion.

Hereinafter, a notching method using the notching apparatus 100 according to the first embodiment of the present invention will be described.

[Notching Method for Secondary Battery According to First Embodiment of the Present Invention]

Figure 7:
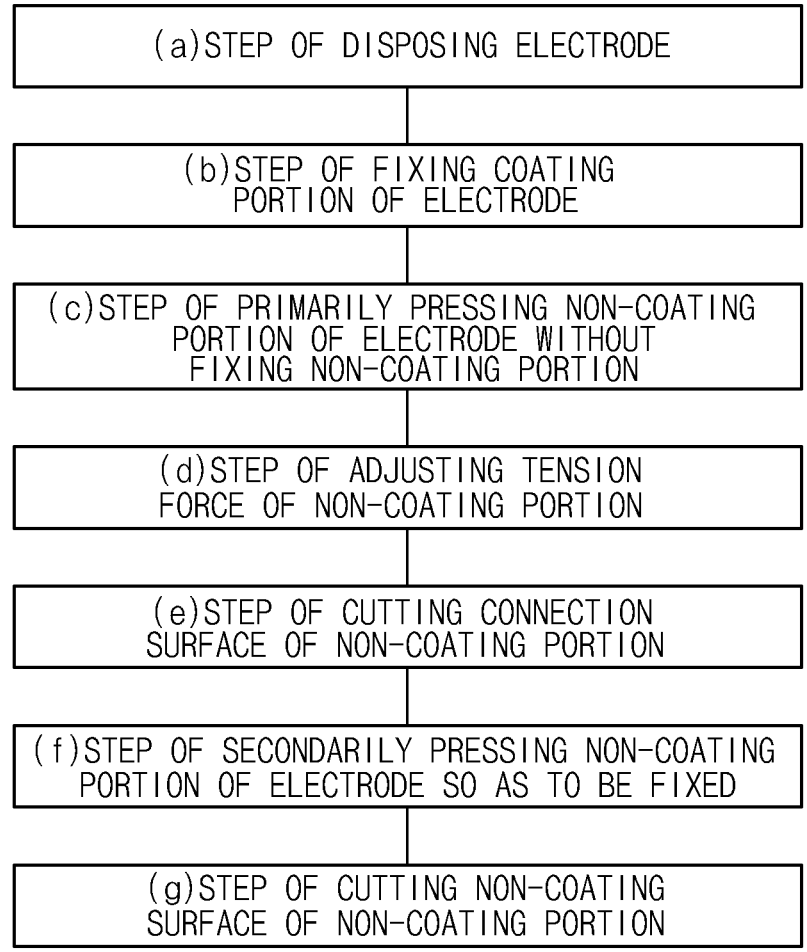
FIG. 7 is a process view of a notching method for the secondary battery according to the first embodiment of the present invention.

As illustrated in FIG. 7, a notching method for a secondary battery according to the first embodiment of the present invention comprises a step (a) of disposing an electrode, a step (b) of fixing a coating portion of the electrode, a step (c) of primarily pressing a non-coating portion of the electrode, a step (d) of adjusting tension force of the non-coating portion of the electrode, a step (e) of cutting a connection surface provided on the non-coating portion of the electrode, a step (f) of secondarily pressing the non-coating portion of the electrode so as to be fixed, and a step (g) of cutting a non-coating surface provided on the non-coating portion of the electrode.

Figure 8:
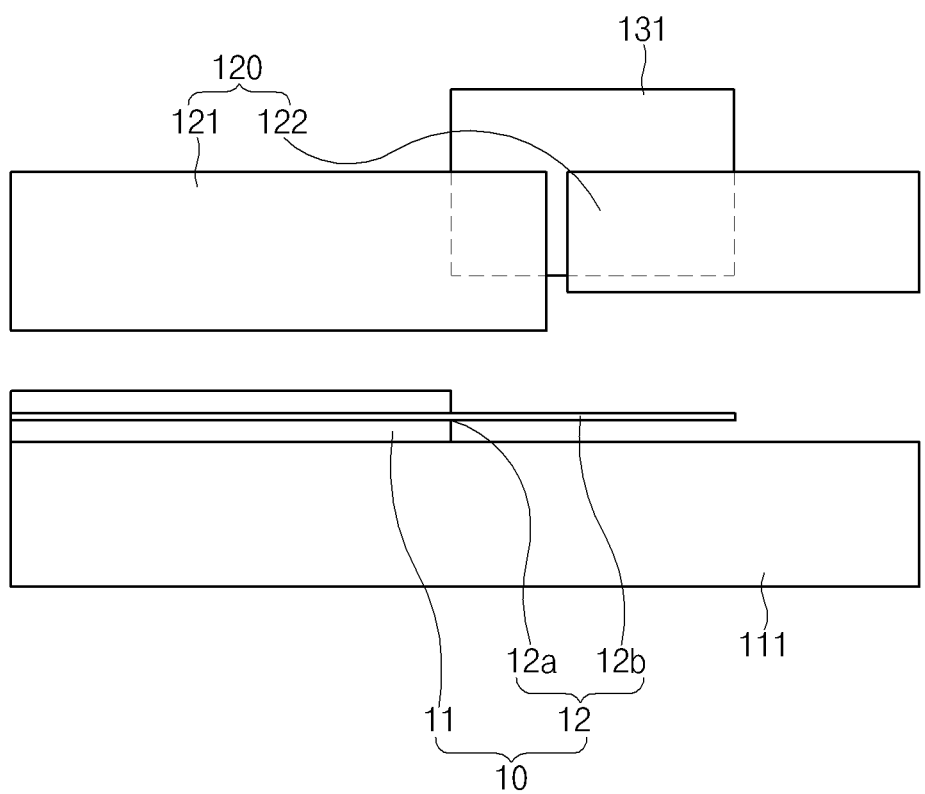
FIG. 8 is a schematic side view illustrating a step (a) of the notching method for the secondary battery according to the first embodiment of the present invention.

As illustrated in FIG. 8, in the step (a), the electrode 10 constituted by the coating portion 11 coated with an electrode active material the non-coating portion 12 that is not coated with the electrode active material is disposed on a die 111 of a lower mechanism 110. Here, a portion to be cut of the non-coating portion 12 is disposed in an insertion groove 111a formed in the die 111.

Figure 9:
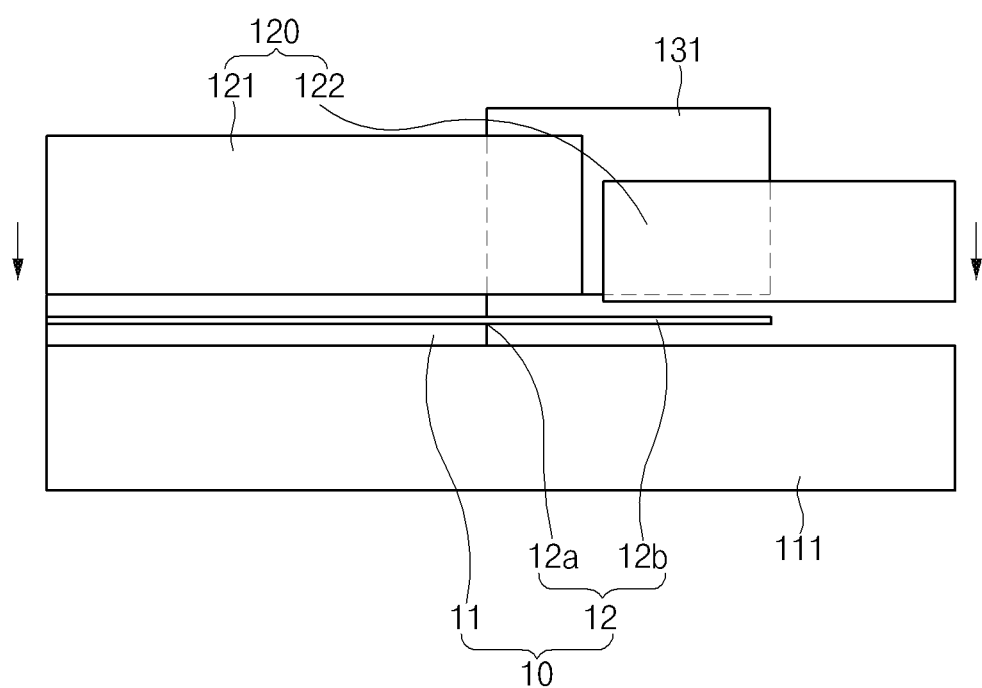
FIG. 9 is a schematic side view illustrating a step (b) of the notching method for the secondary battery according to the first embodiment of the present invention.

As illustrated in FIG. 9, in the step (b), the coating portion 11 of the electrode 10 disposed on the die 111 of the lower mechanism 110 is pressed and fixed by using the first stripper 121 of the stripper 120.

That is, when a punch holder 132 of the upper mechanism 130 descends, the stripper 120 comprising the first stripper 121 and the second stripper 122, which are installed on the punch holder 132, descend together with a punch 131. Here, the first stripper 121 disposed at the lowermost end may first press and fix the coating portion 11 of the electrode 10.

Figure 10:
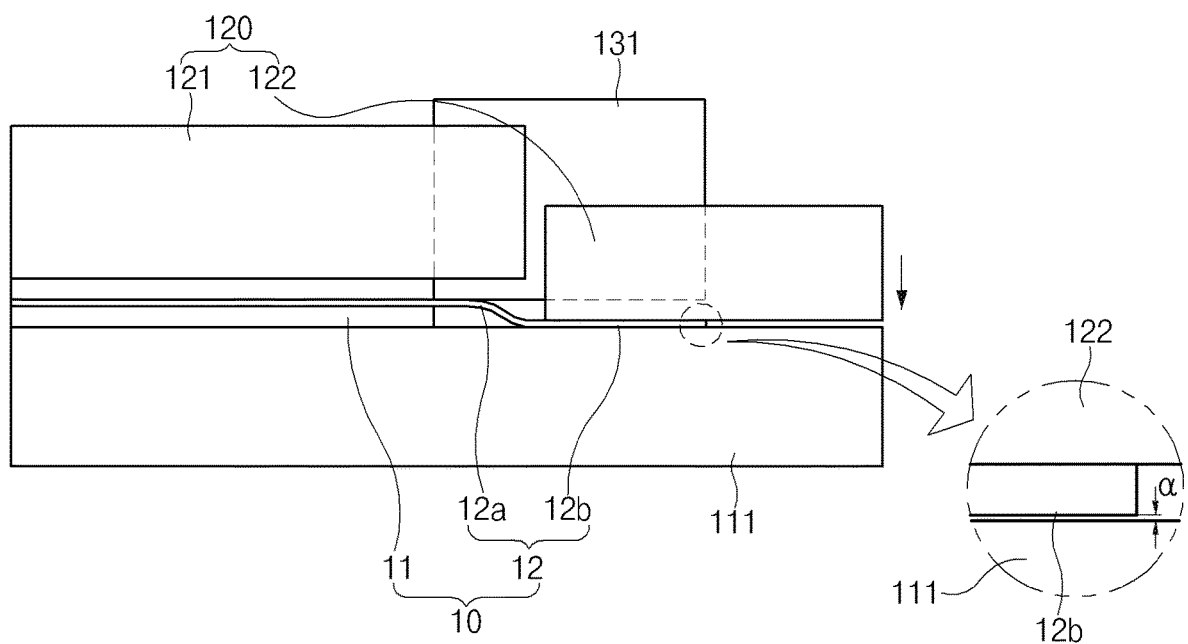
FIG. 10 is a schematic side view illustrating a step (c) of the notching method for the secondary battery according to the first embodiment of the present invention.

As illustrated in FIG. 10, in the step (c), the non-coating portion 12 of the electrode 10 disposed on the die 111 of the lower mechanism 110 is pressed by using the second stripper 122. Here, the second stripper 122 is provided in a pair. The pair of second strippers 122 primarily press a non-coating surface 12b of the non-coating portion 12 comprising the connection surface 12a connected to the coating portion 11 and a non-coating surface 12b extending from the connection surface 12a without fixing the non-coating surface 12b to the die 111.

That is, when the punch holder 132 descends again, the second strippers 122 and the punch 131 descend together with each other. Thus, the second strippers 122 disposed below the punch 131 press the non-coating surface 12b of the non-coating portion 12. Here, the second strippers 122 press the non-coating surface 12b without fixing the non-coating surface 12b to the die 111. That is to say, as illustrated in an expanded view of FIG. 11, the non-coating surface 12b may move because a gap a is formed between the non-coating surface 12b and the die 111. Thus, the connection surface 12a formed between the coating portion 11 and the non-coating surface 12b may be unwrinkled by restoring force.

Figure 11:
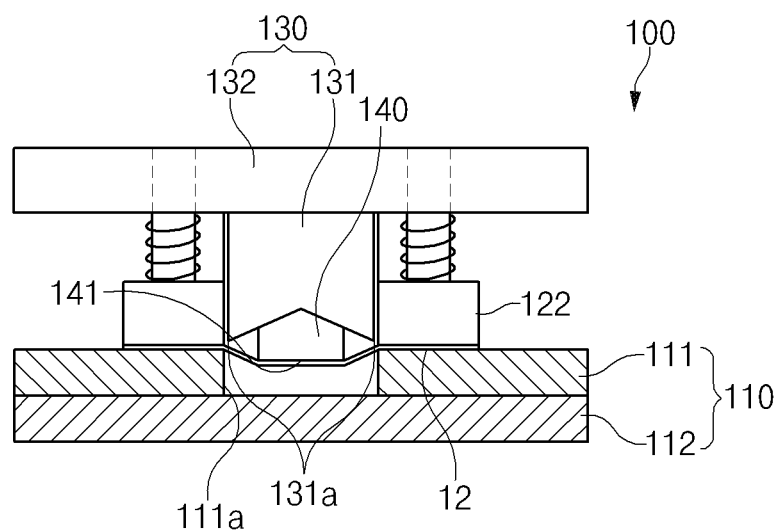
FIG. 11 is a schematic front view illustrating a step (d) of the notching method for the secondary battery according to the first embodiment of the present invention.

As illustrated in FIG. 11, in the step (d), the non-coating surface 12b of the non-coating portion 12 disposed between the pair of second strippers 122 is pressed through the pressing member 140 to increase in tension force. That is, the pressing member 140 may be disposed on a bottom surface of the punch 131. Here, since a pressing surface 141 is disposed below a cutting blade 131a of the punch 131, the pressing member 140 may press the non-coating portion 12 to increase in tension force before the punch 131 cuts the connection surface 12a. Thus, the wrinkles of the non-coating portion 12 may be effectively removed.

Here, the pressing member 140 may press the non-coating surface 12b of the non-coating portion 12 to increase in tension force of the non-coating portion 12, thereby preventing the connection surface 12a of the non-coating portion 12 from being folded.

Figure 12:
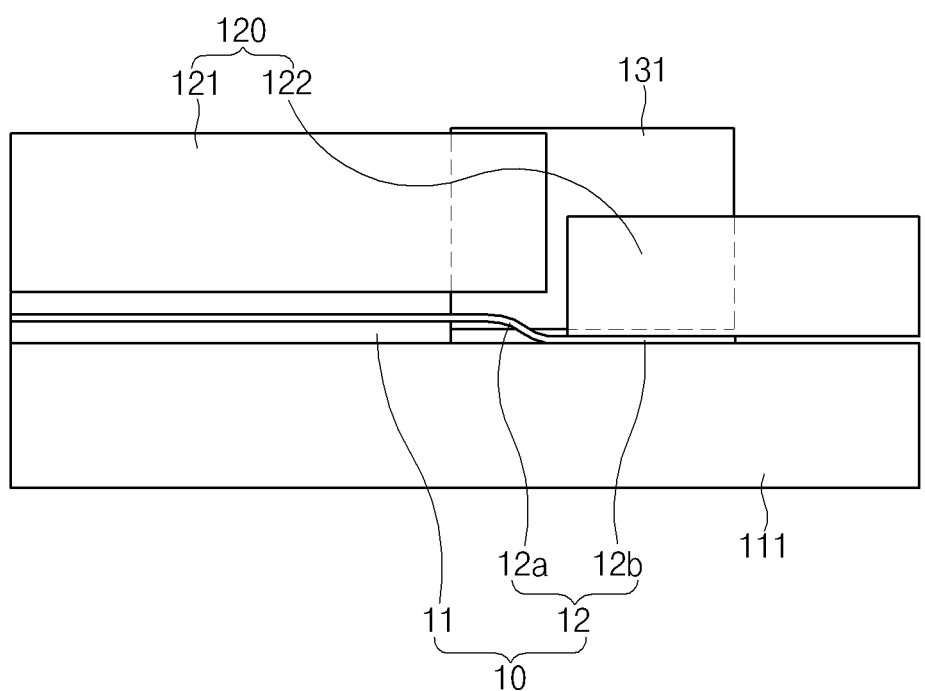
FIG. 12 is a schematic side view illustrating a step (e) of the notching method for the secondary battery according to the first embodiment of the present invention.

As illustrated in FIG. 12, in the step (e), the connection surface 12a of the non-coating portion 12 disposed between the pair of second strippers 122 is cut by using the punch 131 of the upper mechanism 130.

That is, when the punch holder 132 descends again, the punch 131 disposed at the uppermost end cuts the non-coating portion 12. Here, since the connection surface 12a of the non-coating portion 12 is disposed above the non-coating surface 12b, the punch 131 cuts the connection surface 12a first. Here, since the wrinkles are not formed on the connection surface 12a, the connection surface 12 may be cut without forming burr to improve cutting quality.

Figure 13:
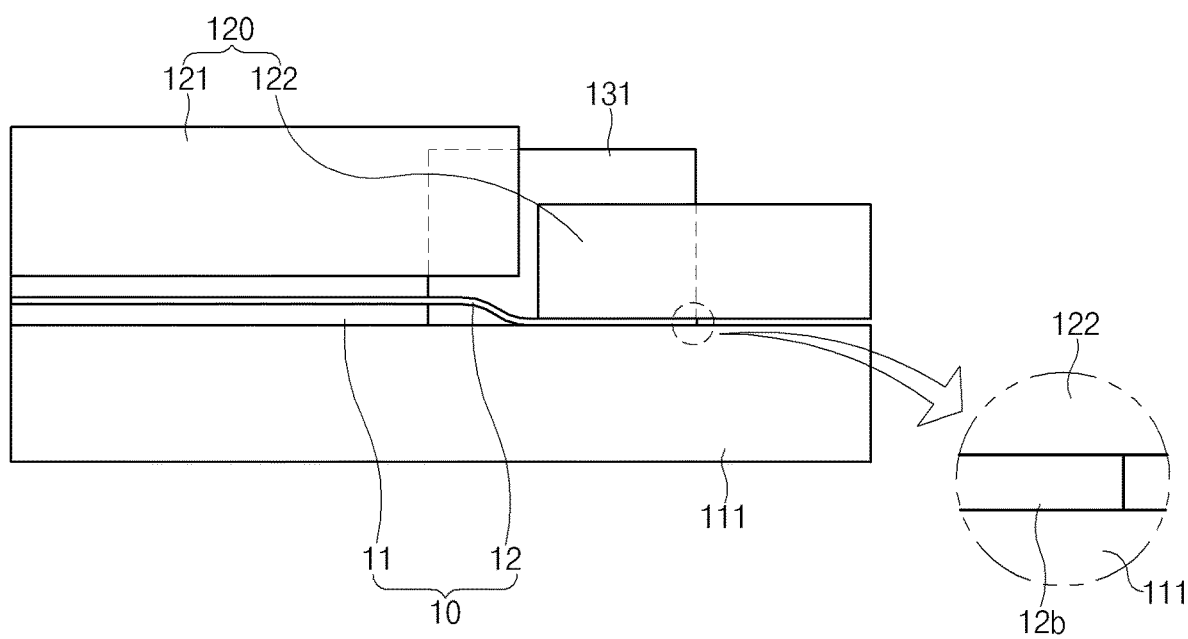
FIG. 13 is a schematic side view illustrating a step (e) and a step (f) of the notching method for the secondary battery according to the first embodiment of the present invention.

As illustrated in FIG. 13, in the step (f), when the cutting of the connection surface 12a is completed, the second strippers 122 secondarily press the non-coating surface 12b of the non-coating portion 12 so that the non-coating surface 12b is fixed to the die 111 of the lower mechanism 110.

That is, when the punch holder 132 descends again, the second strippers 122 secondarily press the non-coating surface 12b while descending so that the non-coating surface 12b is fixed to the die 111 of the lower mechanism 110.

In the step (g), when the non-coating surface 12b is completely fixed, the non-coating surface 12b may be cut through the punch 131 of the upper mechanism 130 to complete an electrode tab.

That is, when the punch holder 132 descends again, the punch 131 of the upper mechanism, which cuts the connection surface 12a, may continuously cut the non-coating surface 12b. Here, since both ends of the non-coating surface 12b are fixed by the second strippers 122, the non-coating surface 12b may be cut without forming the burr.

Thus, in the notching method for the secondary battery according to the first embodiment of the present invention, the coating portion 11 and the non-coating portion 12 of the electrode 10 is separately pressed and fixed. Here, the non-coating surface 12b of the non-coating portion 12 may be primarily pressed without being fixed, and then the non-coating surface 12b may be secondarily pressed to be fixed. Thus, the non-coating portion of the electrode 10 may be accurately cut to improve the cutting quality. Particularly, when the non-coating portion 12 is cut, the non-coating portion may be pressed to increase in tension force through the pressing member 140 to improve the cutting accuracy of the non-coating portion.

Hereinafter, in descriptions of another embodiment of the present invention, constituents of the second embodiment having the same function as the first embodiment have been given the same reference numeral in the drawings, and thus duplicated description will be omitted.

[Notching Apparatus for Secondary Battery According to Second Embodiment of the Present Invention]

Figure 14:
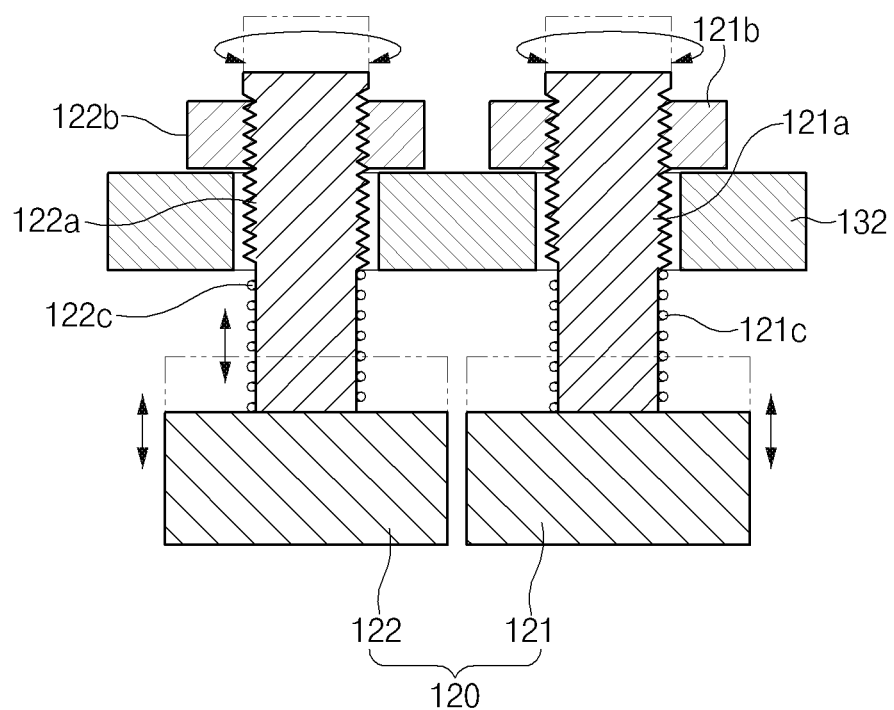
FIG. 14 is a cross-sectional view of a notching apparatus for a secondary battery according to a second embodiment of the present invention.

As illustrated in FIG. 14, a notching apparatus 100 for a secondary battery according to a second embodiment of the present invention comprises a lower mechanism 110, a stripper 120, an upper mechanism 130, and a pressing member 140. The stripper 120 comprises first and second strippers 121 and 122.

Here, the first stripper 121 is installed on a punch holder 132 so as to be adjustable in length in a direction of the lower mechanism 110 or in an opposite direction. That is, the first stripper 121 may be adjusted in height according to an electrode 10 disposed on the lower mechanism 110. Thus, when the punch holder 132 of the upper mechanism 130 descends, a time taken to allow the first stripper 121 to press the electrode 10 may be adjusted, and also, pressing force applied to the electrode 10 may be adjusted.

For example, the first stripper 121 comprises a first guide member 121a disposed on a top surface of the first stripper 121 to pass the punch holder 132, a first fixing nut 121b coupled to a front end of the first guide member 121a passing through the punch holder 132, and a first elastic member 121c wound around the first guide member 121a between the first stripper 121 and the punch holder 132.

That is, the first stripper 121 is installed on the punch holder 132 so as to be movable in a direction of the lower mechanism 110 or in an opposite direction by the first guide member 121a and is prevented from being separated from the punch holder 132 by the first fixing nut 121b. Here, since the first fixing nut 121b moves in a longitudinal direction of the first guide member 121a, the first stripper 121 may be adjustable in height. Also, the first stripper 121 may be disposed to be spaced apart from the punch holder 132 by elastic force of the first elastic member 121c.

The second stripper 122 is installed on a punch holder 132 so as to be adjustable in length in a direction of the lower mechanism 110 or in an opposite direction. That is, the second stripper 122 may be adjusted in height according to an electrode 10 disposed on the lower mechanism 110. Thus, when the punch holder 132 of the upper mechanism 130 descends, a time taken to allow the second stripper 122 to press the electrode 10 may be adjusted, and also, pressing force applied to the electrode 10 may be adjusted.

For example, the second stripper 122 comprises a second guide member 122a disposed on a top surface of the second stripper 122 to pass the punch holder 132, a second fixing nut 122b coupled to a front end of the second guide member 122a passing through the punch holder 132, and a second elastic member 122c wound around the second guide member 122a between the second stripper 122 and the punch holder 132.

That is, the second stripper 122 is installed on the punch holder 132 so as to be movable in a direction of the lower mechanism 110 or in an opposite direction by the second guide member 122a and is prevented from being separated from the punch holder 132 by the second fixing nut 122b. Here, since the second fixing nut 122b moves in a longitudinal direction of the second guide member 122a, the second stripper 122 may be adjustable in height. Also, the second stripper 122 may be disposed to be spaced apart from the punch holder 132 by elastic force of the second elastic member 122c.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A notching apparatus for a secondary battery, comprising:
   a lower mechanism comprising a die and a die holder to which the die is fixed, the die engaging an electrode provided with a coating portion coated with an electrode active material and a non-coating portion that is not coated with the electrode active material;
   a stripper comprising a first stripper and a pair of second strippers, the first stripper being disposed above the coating portion disposed on the lower mechanism in order to press the coating portion while descending toward the coating portion, and the pair of second strippers being disposed above the non-coating portion disposed on the lower mechanism in order to press and fix the non-coating portion while descending toward the non-coating portion;
   an upper mechanism comprising a punch and a punch holder, the punch being provided between the pair of second strippers and provided with a cutting blade cutting the non-coating portion when the non-coating portion is disposed between the pair of second strippers and the punch holder fixing the punch to allow the punch to move in a direction of the lower mechanism; and
   a pressing member pressing the non-coating portion when the non-coating portion is disposed between the pair of second strippers to increase in tension force when the non-coating portion is cut by the punch.

2. The notching apparatus of claim 1, wherein the pressing member is provided on a bottom surface of the punch and further protrudes downward further than the cutting blade when viewed with respect to a surface of the non-coating portion.

3. The notching apparatus of claim 1, wherein the pressing member is integrally provided or detachably provided on a bottom surface of the punch.

4. The notching apparatus of claim 1, wherein a pressing surface of the pressing member, which presses the non-coating portion, is provided as a horizontal surface.

5. The notching apparatus of claim 1, wherein the pressing member is made of a synthetic resin having elasticity.

6. The notching apparatus of claim 1, wherein the first stripper is installed on the punch holder corresponding to the coating portion to press the coating portion while descending by the punch holder.

7. The notching apparatus of claim 6, wherein the first stripper is installed on the punch holder so as to be adjustable in length in the direction of the lower mechanism or in an opposite direction thereof.

8. The notching apparatus of claim 1, wherein the second strippers are installed on the punch holder corresponding to the non-coating portion to press the non-coating portion.

9. The notching apparatus of claim 8, wherein each of the second strippers is installed to be adjustable in length in the direction of the lower mechanism or in an opposite direction thereof.

10. The notching apparatus of claim 1, wherein the non-coating portion comprises a connection surface connected to the coating portion and a non-coating surface extending from the connection surface, and
    wherein the second strippers press the non-coating surface to fix the non-coating surface to the die.

11. The notching apparatus of claim 10, wherein the punch continuously cuts the connection surface and the non-coating surface, which are disposed between the pair of second strippers.

12. The notching apparatus of claim 11, wherein the second strippers press the non-coating surface without fixing the non-coating surface to the lower mechanism when the punch cuts the connection surface.

13. The notching apparatus of claim 12, wherein the second strippers press the non-coating surface so that the non-coating surface is fixed to the lower mechanism when the punch cuts the non-coating surface.

\* \* \* \* \*